(12) United States Patent
Ohkura

(10) Patent No.: US 10,341,577 B2
(45) Date of Patent: Jul. 2, 2019

(54) IMAGING APPARATUS

(71) Applicant: RICOH IMAGING COMPANY, LTD., Tokyo (JP)

(72) Inventor: Tadahisa Ohkura, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 250 days.

(21) Appl. No.: 15/492,480

(22) Filed: Apr. 20, 2017

(65) Prior Publication Data

US 2017/0310902 A1 Oct. 26, 2017

(30) Foreign Application Priority Data

Apr. 26, 2016 (JP) .................................. 2016-87873

(51) Int. Cl.
*H04N 5/232* (2006.01)
*H04N 5/235* (2006.01)
(Continued)

(52) U.S. Cl.
CPC ............. *H04N 5/243* (2013.01); *H04N 5/232* (2013.01); *H04N 5/238* (2013.01);
(Continued)

(58) Field of Classification Search
CPC .. H04N 5/243; H04N 5/23216; H04N 5/2351; H04N 5/238; H04N 5/232;
(Continued)

(56) References Cited

U.S. PATENT DOCUMENTS

| 5,382,997 A | 1/1995 | Sato et al. |
| 5,485,242 A | 1/1996 | Sato et al. |

(Continued)

FOREIGN PATENT DOCUMENTS

| EP | 0451872 | 3/1995 |
| JP | 3-296128 | 12/1991 |

(Continued)

*Primary Examiner* — Pritham D Prabhakher
(74) *Attorney, Agent, or Firm* — Greenblum & Bernstein, P.L.C.

(57) ABSTRACT

An imaging apparatus comprising an imaging device; a photometry device; first to third exposure factors; first and second operation members for setting the first and second exposure factors; a first-to-third-exposure-factors-calculating-and-setting exposure mode for calculating and setting the first to third exposure factors to the calculated and set ones; a first-exposure-factor-manually-setting exposure mode for manually setting the first exposure factor, and calculating and setting the second and third exposure factors; a second-exposure-factor-manually-setting exposure mode for manually setting the second exposure factor, and calculating and setting the first and third exposure factors; and a first/second-exposure-factors-manually-setting exposure mode for manually setting the first and second exposure factors, and calculating and setting the third exposure factor; the operation of the second operation member changing the first-exposure-factor-manually-setting exposure mode to the first/second-exposure-factors-manually-setting exposure mode.

12 Claims, 8 Drawing Sheets

(51) Int. Cl.
*H04N 5/238* (2006.01)
*H04N 5/243* (2006.01)

(52) U.S. Cl.
CPC ....... *H04N 5/2351* (2013.01); *H04N 5/23216* (2013.01); *H04N 5/23293* (2013.01)

(58) Field of Classification Search
CPC .. H04N 5/23293; H04N 5/2352; H04N 5/353; G03B 7/097; G03B 7/0807; G03B 7/08; G03B 7/091; G03B 17/20
USPC .......................................................... 348/362
See application file for complete search history.

(56) References Cited

U.S. PATENT DOCUMENTS

| | | | | |
|---|---|---|---|---|
| 6,240,256 B1* | 5/2001 | Hozumi | ................ | G03B 7/097 396/223 |
| 7,961,250 B2* | 6/2011 | Hirai | ..................... | G03B 7/097 348/230.1 |
| 7,978,256 B2* | 7/2011 | Kunishige | ......... | H04N 5/23293 348/350 |
| 8,072,508 B2* | 12/2011 | Hirai | ................. | H04N 5/23293 348/229.1 |
| 8,823,808 B2* | 9/2014 | Border | .............. | H04N 5/23267 348/208.4 |
| 9,871,973 B2* | 1/2018 | Fukuda | ................ | H04N 5/2353 |
| 2008/0062276 A1 | 3/2008 | Hirai et al. | | |
| 2008/0062277 A1 | 3/2008 | Hirai et al. | | |
| 2009/0051807 A1* | 2/2009 | Kunishige | .......... | H04N 5/23212 348/353 |
| 2010/0073516 A1* | 3/2010 | Minakuti | ............... | H04N 5/217 348/229.1 |
| 2013/0155276 A1* | 6/2013 | Ueda | ........................ | G02B 7/36 348/223.1 |
| 2014/0002709 A1* | 1/2014 | Sakurabu | ........... | H04N 5/23293 348/333.09 |
| 2014/0307154 A1* | 10/2014 | Fukuda | ................ | H04N 5/2353 348/362 |
| 2015/0015774 A1* | 1/2015 | Sugie | ................... | H04N 5/2353 348/364 |
| 2017/0332008 A1* | 11/2017 | Tsuchiya | ................ | G03B 15/00 |

FOREIGN PATENT DOCUMENTS

| | | |
|---|---|---|
| JP | 5-27293 | 2/1993 |
| JP | 5-27294 | 2/1993 |
| JP | 5-27295 | 2/1993 |
| JP | 5-27296 | 2/1993 |
| JP | 5-27297 | 2/1993 |
| JP | 5-27298 | 2/1993 |
| JP | 5-61095 | 3/1993 |
| JP | 5-61096 | 3/1993 |
| JP | 5-61097 | 3/1993 |
| JP | 5-249531 | 9/1993 |
| JP | 2008-70510 | 3/2008 |
| JP | 2008-70520 | 3/2008 |

* cited by examiner

IMAGING APPARATUS

FIELD OF THE INVENTION

The present invention relates to an imaging apparatus having pluralities of exposure modes, particularly to an imaging apparatus capable of changing exposure modes by exposure-factor-changing operations.

BACKGROUND OF THE INVENTION

A recent camera comprises pluralities of exposure modes, from which a user can set a desired exposure mode. The setting of an exposure mode is generally conducted by a particular operation member (exposure mode dial) or exposure mode menu, but increased types of exposure modes have made it necessary to operate plural buttons to switch exposure modes.

Typical exposure modes include a "programmed exposure mode" for automatically setting a shutter speed (Tv) and an aperture value (Av) to the optimum values to obtain proper exposure depending on the brightness value (Bv) of an object, a "shutter speed priority exposure mode" for manually setting a shutter speed with an aperture value automatically set to the optimum value depending on the brightness value, and an "aperture value priority exposure mode" for manually setting an aperture value with a shutter speed automatically set to the optimum value depending on the brightness value.

JP 5-27296 A discloses an exposure-mode-setting method capable of changing a programmed exposure mode to a shutter speed priority exposure mode [Av auto, Tv manual] by operating a shutter-speed-setting member (Tv dial), without operating an exposure mode dial or an exposure mode menu, and changing the programmed mode to the aperture value priority exposure mode [Av manual, Tv auto] by operating an aperture-value-setting member (Av dial). An initial Tv or Av calculated by a programmed mode is changed by the Tv or Av dial.

However, because the ISO sensitivity (Sv) can be freely set in recent digital cameras, the exposure-mode-setting method of JP 5-27296 A cannot handle (a) a programmed exposure mode (P exposure mode), (b) an ISO sensitivity priority exposure mode (Sv priority exposure mode), (c) a shutter speed/aperture value priority exposure mode (TAv priority exposure mode), (d) a manual exposure mode (M exposure mode), etc. In this method, a user has to determine which exposure factor is manually set, with remaining exposure factors automatically set, and then manually set a particular exposure factor by an exposure mode dial or an exposure mode menu, needing lengthy steps.

The programmed exposure mode (P exposure mode) expressed by [Av auto, Tv auto, Sv auto] automatically sets a shutter speed (Tv), an aperture value (Av), and ISO sensitivity (Sv) to the optimum values, to obtain proper exposure depending on the brightness value.

The ISO sensitivity priority exposure mode (Sv priority exposure mode) expressed by [Av auto, Tv auto, Sv manual] manually sets ISO sensitivity (Sv), and automatically sets a shutter speed (Tv) and an aperture value (Av), to obtain proper exposure depending on the brightness value.

The shutter speed/aperture value priority exposure mode (TAv priority exposure mode) expressed by [Av manual, Tv manual, Sv auto] manually sets a shutter speed (Tv) and an aperture value (Av), and automatically sets ISO sensitivity (Sv), to obtain proper exposure depending on the brightness value.

The manual exposure mode (M exposure mode) expressed by [Av manual, Tv manual, Sv manual] manually sets all of a shutter speed (Tv), an aperture value (Av), and ISO sensitivity (Sv).

JP 2008-70520 A discloses an imaging apparatus comprising a means for automatically calculating a shutter speed and an aperture value based on ISO sensitivity set by an electronic dial, and setting an ISO sensitivity priority exposure mode, to obtain proper exposure depending on the brightness value.

JP 2008-70510 A discloses an imaging apparatus comprising electronic dials for setting a shutter speed and an aperture value, and a means for selecting a shutter speed/ aperture value priority exposure mode for automatically calculating ISO sensitivity based on a shutter speed and an aperture value set by a user, to obtain proper exposure depending on the brightness value.

In the imaging apparatuses of JP 2008-70520 A and JP 2008-70510 A, however, an exposure mode dial or an exposure mode menu needs to be operated to select an ISO sensitivity priority exposure mode or a shutter speed/aperture value priority exposure mode. Thus, the changing of exposure modes, and the setting of exposure factors should be conducted separately, failing to eliminate lengthy steps.

OBJECT OF THE INVENTION

Accordingly, an object of the present invention is to provide an easily operable imaging apparatus.

SUMMARY OF THE INVENTION

As a result of intensive research in view of the above object, the inventors have found that when an imaging apparatus comprising at least two operation members for changing exposure factors is provided with an algorithm, in which when an operation member is operated in a particular exposure mode, (a) an exposure factor can be manually set to a desired value, simultaneously with changing the particular exposure mode to a manually setting mode, if that exposure factor is in an automatic mode, and (b) an exposure factor is manually set to a new value, without changing the particular exposure mode, if that exposure factor is in a manual mode, the manual setting of an exposure factor and the changing of an exposure mode can be simultaneously conducted by one manual operation of an operation member. The present invention has been completed based on such finding.

Thus, the first imaging apparatus of the present invention comprises an imaging device taking an image of an object formed by an optical system;

a photometry device for metering the brightness of an object;

first to third exposure factors for determining the exposure condition of the imaging device;

a first operation member for setting the first exposure factor;

a second operation member for setting the second exposure factor;

a first-exposure-factor-manually-setting exposure mode for manually setting the first exposure factor, and calculating and setting the second and third exposure factors depending on the set first exposure factor and the brightness value obtained by the photometry device; and a first/second-exposure-factors-manually-setting exposure mode for manually setting the first and second exposure factors, and calculating and setting the third exposure factor depending on the set first and second exposure factors and the brightness value obtained by the photometry device;

when the second operation member is operated in the first-exposure-factor-manually-setting exposure mode, the second exposure factor being manually set, and the first-exposure-factor-manually-setting exposure mode being changed to the first/second-exposure-factors-manually-setting exposure mode.

The first imaging apparatus of the present invention preferably further comprises a first-to-third-exposure-factors-calculating-and-setting exposure mode for calculating and setting the first to third exposure factors depending on the brightness value obtained by the photometry device.

It is preferable that when the first operation member is operated in the first-to-third-exposure-factors-calculating-and-setting exposure mode, the first exposure factor is manually set, and the first-to-third-exposure-factors-calculating-and-setting exposure mode is changed to the first-exposure-factor-manually-setting exposure mode.

It is preferable that when the first operation member is operated in the first/second-exposure-factors-manually-setting exposure mode, the first exposure factor is manually set, with the first/second-exposure-factors-manually-setting exposure mode unchanged.

The first imaging apparatus of the present invention preferably further comprises a first one-operation-returning (setting) means for returning (setting) the first/second-exposure-factors-manually-setting exposure mode to the second-exposure-factor-manually-setting exposure mode, by changing the first exposure factor to the calculated and set one by one operation; and/or a second one-operation-returning (setting) means for returning (setting) the first/second-exposure-factors-manually-setting exposure mode to the first-exposure-factor-manually-setting exposure mode, by changing the second exposure factor to the calculated and set one by one operation.

The first imaging apparatus of the present invention preferably further comprises a one-operation-all-returning (setting) means for returning (setting) all manually set exposure factors among the first and second exposure factors to the calculated and set ones by one operation.

The first imaging apparatus of the present invention preferably further comprises a second-exposure-factor-manually-setting exposure mode for manually setting the second exposure factor, and calculating and setting the first and third exposure factors depending on the set second exposure factor and the brightness value obtained by the photometry device.

The second imaging apparatus of the present invention further comprises a third operation member for setting a third exposure factor; whose operation in the first/second-exposure-factors-manually-setting exposure mode changes this exposure mode to a first-to-third-exposure-factors-manually-setting exposure mode, which can manually set the first to third exposure factors; and a display for indicating the comparison of the amount of exposure calculated from the set first to third exposure factors, and the amount of exposure calculated depending on the brightness value obtained by the photometry device, in the first-to-third-exposure-factors-manually-setting exposure mode.

The second imaging apparatus of the present invention preferably further comprises first to third one-operation-returning (setting) means each returning (setting) each manually set exposure factor among the first to third exposure factors to the calculated and set ones by one operation.

In the second imaging apparatus of the present invention, each of the first to third operation members is preferably provided with each of the first to third one-operation-returning (setting) means for returning (setting) the first to third exposure factors to the calculated and set ones.

In the second imaging apparatus of the present invention, the first to third operation members are operated in different manners between when the first to third one-operation-returning means are used, and when the first to third exposure factors are manually set.

The second imaging apparatus of the present invention preferably further comprises a one-operation-all-returning means for returning all manually set exposure factors among the first to third exposure factors to the calculated and set ones by one operation.

The manual setting of any one of the first to third exposure factors and the changing of an exposure mode are carried out according to an algorithm, in which when one of the operation members is operated in a particular exposure mode, (a) an exposure factor changeable by the operation member is manually set to a desired value, and the particular exposure mode is changed to a mode of manually setting that exposure factor, if that exposure factor is in an automatic mode, and (b) that exposure factor is manually set to a new value, without changing the particular exposure mode, if that exposure factor is in a manual mode.

The present disclosure relates to subject matter contained in Japanese Patent Application No. 2016-87873 (filed on Apr. 26, 2016), which is expressly incorporated herein by reference in its entirety.

DESCRIPTION OF THE PREFERRED EMBODIMENTS

The embodiments of the present invention will be explained in detail below referring to the attached drawings. Explanations of each embodiment are applicable to other embodiments unless otherwise mentioned. Explanations below are not restrictive, but various modifications may be made within the scope of the present invention.

[1] First Embodiment

The imaging apparatus according to the first embodiment of the present invention comprises an imaging device taking an image of an object formed by an optical system;

a photometry device for metering the brightness of an object;

first to third exposure factors for determining the exposure condition of the imaging device;

a first operation member for setting the first exposure factor;

a second operation member for setting the second exposure factor;

a first-to-third-exposure-factors-calculating-and-setting exposure mode for calculating and setting the first to third exposure factors depending on the brightness value obtained by the photometry device;

a first-exposure-factor-manually-setting exposure mode for manually setting the first exposure factor, and calculating and setting the second and third exposure factors depending on the set first exposure factor and the brightness value obtained by the photometry device;

a second-exposure-factor-manually-setting exposure mode for manually setting the second exposure factor, and calculating and setting the first and third exposure factors depending on the set second exposure factor and the brightness value obtained by the photometry device; and a first/second-exposure-factors-manually-setting exposure mode for manually setting the first and second exposure factors, and calculating and setting the third exposure factor depending on the set first and second exposure factors and the brightness value obtained by the photometry device;

the operation of the second operation member in the first-exposure-factor-manually-setting exposure mode manually setting the second exposure factor, thereby entering the first/second-exposure-factors-manually-setting exposure mode.

Figure 1:
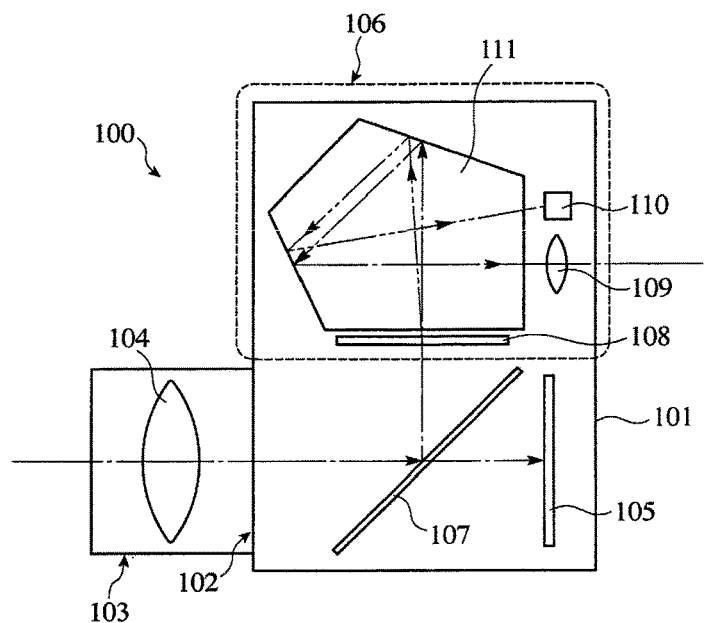
FIG. 1 is a schematic view showing the internal structure of the imaging apparatus of the present invention.
Figure 2A:
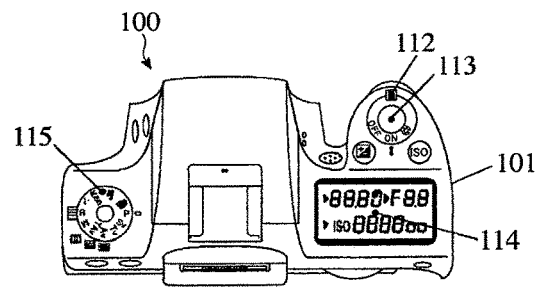
FIG. 2(a) is a plan view showing the appearance of the imaging apparatus according to the first embodiment of the present invention.
Figure 2B:
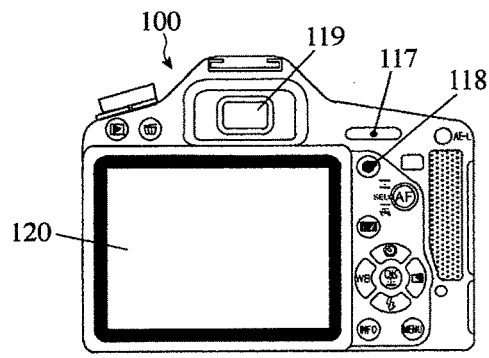
FIG. 2(b) is a rear view showing the appearance of the imaging apparatus according to the first embodiment of the present invention.
Figure 2C:
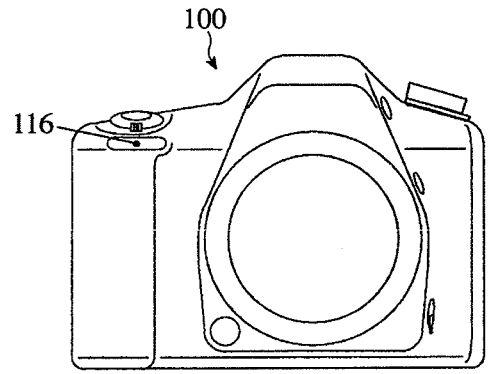
FIG. 2(c) is a front view showing the appearance of the imaging apparatus according to the first embodiment of the present invention.

FIG. 1 shows the internal structure of the imaging apparatus common in the first and second embodiments of the present invention, and FIGS. 2(a), 2(b) and 2(c) show the appearance of the imaging apparatus 100 according to the first embodiment of the present invention.

(1) Structure

As shown in FIG. 1, the imaging apparatus 100 comprises a body 101, an opening 102 of the body 101 for taking light from an object, and a lens barrel 103 connected to the opening 102. The lens barrel 103 contains photographic lenses 104. The body 101 comprises an imaging device 105 converting light from the object to an electric signal, and a main mirror 107 disposed between the imaging device 105 and the photographic lens 104 for dividing light from the object into beams to the imaging device 105 and beams to a viewfinder 106. The viewfinder 106 disposed at a position equivalent to that of the imaging device 105 comprises a focusing screen 108 for forming an image of an incident light, and a pentaprism 111 for guiding the image on the focusing screen 108 to an ocular lens 109 and a photometry device 110.

Figure 3A:
FIG. 3(a) is a schematic view showing an example of viewfinder liquid crystal panels in the imaging apparatus of the present invention.
Figure 3B:
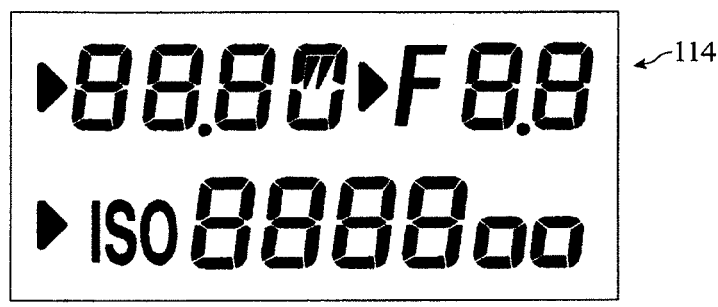
FIG. 3(b) is a schematic view showing an example of external liquid crystal panels in the imaging apparatus of the present invention.

As shown in FIGS. 2(a), 2(b) and 2(c), a power supply switch 112, a release switch 113, and an external liquid crystal panel 114 are disposed on the right side of an upper surface of the body 101 of the imaging apparatus 100, and an exposure mode dial 115 is disposed on the left side of an upper surface of the body 101. The body 101 has a front electronic dial 116 on the front surface, and a rear electronic dial 117, a reset button 118, a viewfinder 119 and a rear liquid crystal panel 120 on the rear surface. As shown in FIG. 3(a), a viewfinder liquid crystal panel 121 is disposed in the viewfinder 119. Information such as an exposure condition is displayed on the external liquid crystal panel 114 [see FIG. 3(b)], the rear liquid crystal panel 120, and the viewfinder liquid crystal panel 121.

The image of an object formed by an optical system comprising the photographic lenses 104 is taken by the imaging device 105, and displayed in the rear liquid crystal panel 120, with image data stored in a memory (not shown).

The imaging apparatus 100 has three exposure factors of a shutter speed (Tv), an aperture value (Av) and an ISO sensitivity value (Sv) for determining the exposure condition of the imaging device. The exposure condition is determined by combining these exposure factors. Each exposure factor can be manually set by a user according to the exposure mode, or partially set by a user, with the remainder automatically set to proper exposure calculated by a camera depending on the brightness value, or completely automatically set by a camera. The brightness value is calculated from the object image formed by the optical system and observed by an AE sensor in the photometry device 110.

(2) Exposure Modes

The exposure modes can be set by operating (for example, turning) the exposure mode dial 115 (or selecting an exposure mode menu). The exposure modes include a programmed exposure mode (P exposure mode), an ISO sensitivity priority exposure mode (Sv priority exposure mode), a shutter speed priority exposure mode (Tv priority exposure mode), an aperture value priority exposure mode (Av priority exposure mode), a shutter speed/aperture value priority exposure mode (TAv priority exposure mode), ISO sensitivity/shutter speed priority exposure mode (Sv/Tv priority exposure mode) and an ISO sensitivity/aperture value priority exposure mode (Sv/Av priority exposure mode), as well as a manual exposure mode (M exposure mode), and if necessary, a bulb exposure mode (B exposure mode), a flash-sync exposure mode (X exposure mode), etc.

(i) Programmed Exposure Mode

In the programmed exposure mode, which may be simply called "P exposure mode," a camera automatically sets an aperture value (Av), a shutter speed (Tv) and ISO sensitivity (Sv) to the calculated optimum values, to obtain proper exposure depending on the brightness value (Bv) of an object determined by the photometry device. How the aperture value (Av), the shutter speed (Tv) and the ISO sensitivity (Sv) are combined depending on the brightness value (Bv) is programmed in advance. Depending on the operation of exposure factors, exposure modes are expressed as follows. The programmed exposure mode is expressed by [Av auto, Tv auto, Sv auto], because the aperture value (Av), the shutter speed (Tv) and the ISO sensitivity (Sv) are all calculated and set. It may be called a first-to-third-exposure-factors-calculating-and-setting exposure mode herein.

(ii) ISO-Sensitivity-Manually-Setting Exposure Mode

In the ISO-sensitivity-manually-setting exposure mode, which may be simply called "ISO sensitivity priority exposure mode (Sv priority exposure mode)," a camera automatically calculates and sets the shutter speed (Tv) and the aperture value (Av) according to the ISO sensitivity (Sv) set by a user, to obtain proper exposure depending on the brightness value (Bv) of an object determined by the photometry device. This exposure mode is expressed by [Av auto, Tv auto, Sv manual]. How the aperture value (Av) and the shutter speed (Tv) are set depending on the brightness value (Bv) and the ISO sensitivity (Sv) is programmed in advance. In a digital camera, the ISO sensitivity (Sv) corresponds to a gain of an image signal output from the imaging device (comprising an imaging device). At higher ISO sensitivity, the imaging operation is carried out at a higher gain of an image signal. Accordingly, higher ISO sensitivity emphasizes noise in the image, making it possible to express a lonely or old atmosphere.

(iii) Shutter-Speed-Manually-Setting Exposure Mode

In the shutter-speed-manually-setting exposure mode, which may be simply called "shutter speed priority exposure mode (Tv priority exposure mode)," a camera automatically calculates and sets the aperture value (Av) and the ISO sensitivity (Sv) according to the shutter speed (Tv) set by a user, depending on the brightness value (Bv) of an object determined by the photometry device, to obtain proper exposure. This exposure mode is expressed by [Av auto, Tv manual, Sv auto]. How the aperture value (Av) and the ISO sensitivity (Sv) are set depending on the brightness value (Bv) and the shutter speed (Tv) is programmed in advance.

(iv) Aperture-Value-Manually-Setting Exposure Mode

In the aperture-value-manually-setting exposure mode, which may be simply called "aperture value priority exposure mode (Av priority exposure mode)," a camera automatically calculates and sets the shutter speed (Tv) and the ISO sensitivity (Sv) according to the aperture value (Av) set by a user, depending on the brightness value (Bv) of an object determined by the photometry device, to obtain proper exposure. This exposure mode is expressed by [Av manual, Tv auto, Sv auto]. How the shutter speed (Tv) and the ISO sensitivity (Sv) are set depending on the brightness value (Bv) and the aperture value (Av) is programmed in advance.

(v) Exposure Mode Manually Setting Shutter Speed and Aperture Value

In the exposure mode manually setting a shutter speed and an aperture value, which may be simply called "shutter speed/aperture value priority exposure mode (Tv/Av priority exposure mode, or TAv priority exposure mode)," a camera automatically calculates and sets the ISO sensitivity (Sv) according to the shutter speed (Tv) and the aperture value (Av) set by a user, depending on the brightness value (Bv) of an object determined by the photometry device, to obtain proper exposure. This exposure mode is expressed by [Av manual, Tv manual, Sv auto].

(vi) Exposure Mode Manually Setting ISO Sensitivity and Shutter Speed

In the exposure mode manually setting ISO sensitivity and a shutter speed, which may be simply called "ISO sensitivity/shutter speed priority exposure mode (Sv/Tv priority exposure mode)," a camera automatically calculates and sets the aperture value (Av) according to the ISO sensitivity (Sv) and the shutter speed (Tv) set by a user, depending on the brightness value (Bv) of an object determined by the photometry device, to obtain proper exposure. This exposure mode is expressed by [Av auto, Tv manual, Sv manual].

(vii) Exposure Mode Manually Setting ISO Sensitivity and Aperture Value

In the exposure mode manually setting ISO sensitivity and a shutter speed, which may be simply called "ISO sensitivity/aperture value priority exposure mode (Sv/Av priority exposure mode)," a camera automatically calculates and sets the shutter speed (Tv) according to the ISO sensitivity (Sv) and the aperture value (Av) set by a user, depending on the brightness value (Bv) of an object determined by the photometry device, to obtain proper exposure. This exposure mode is expressed by [Av manual, Tv auto, Sv manual].

(viii) Manual Exposure Mode

In the manual exposure mode, which may be simply called "M exposure mode," the shutter speed, the aperture value and the ISO sensitivity are manually set by a user. This exposure mode is expressed by [Av manual, Tv manual, Sv manual]. Photographing can be conducted with different exposure from the programmed proper exposure in a camera. It may be called herein a mode enabling the manual setting of first to third exposure factors.

(3) Exposure Factor Operation Member

The imaging apparatus 100 comprises a first operation member for setting the first exposure factor, and a second operation member for setting the second exposure factor. The functions of the first and second operation members can be conducted by, for example, a front electronic dial 116 and a rear electronic dial 117 [see FIGS. 2(*b*) and 2(*c*)]. These electronic dials are rotatable disc-shaped operation members, in which exposure factors (parameters) indicated by scales are changed by the directions and amounts of their rotation.

(4) Operation Principle

In the present invention, (a) for example, when the first exposure factor is in an automatic mode, the operation of the first operation member manually sets the first exposure factor to a desired value, and changes the exposure mode to a first-exposure-factor-manually-setting mode, and (b) when the first exposure factor is already in a manual setting, the operation of the first operation member manually sets the first exposure factor to a new value, without changing the exposure mode. This is true in any of the first to third exposure factors. Namely, when an operation member is operated, (a) an exposure factor changeable by the operation member is manually set to a desired value, and the exposure mode is also changed to a mode of manually setting that exposure factor, if that exposure factor is in an automatic mode, and (b) an exposure factor changeable by the operation member is manually set to a new value, without changing the exposure mode, if that exposure factor is already in a manual mode. The imaging apparatus of the present invention is characterized by changing an exposure mode according to the above algorithm. Thus, the algorithm of the present invention enables the manual setting of an exposure mode and the changing of an exposure mode simultaneously by one operation of an operation member, advantageously more simply than a conventional system of changing an exposure mode, which needs two steps of operation, a first step of changing the exposure mode and a second step of manually setting the exposure factor.

(5) Specific Operation (i) First Exposure-Mode-Changing Pattern

The operation of the imaging apparatus 100 will be explained below, in a first pattern in which among three exposure factors of the ISO sensitivity (Sv), the aperture value (Av) and the shutter speed (Tv), the ISO sensitivity (first exposure factor) is changed by turning a front electronic dial 116 (first operation member), and the shutter speed (second exposure factor) is changed by turning a rear electronic dial 117 (second operation member). These two dials 116 and 117 are simply called "Sv dial" and "Tv dial," respectively.

When the Sv dial is operated in the programmed exposure mode [Av auto, Tv auto, Sv auto] (first-to-third-exposure-factors-calculating-and-setting exposure mode) as an initial exposure mode, the ISO sensitivity (first exposure factor) is manually set to a desired value, and the exposure mode is changed to the ISO sensitivity priority exposure mode [Av auto, Tv auto, Sv manual], in which two unchanged exposure factors (Av and Tv) are automatically calculated and set. Also, when the Tv dial is operated in the programmed exposure mode as an initial state, the shutter speed (second exposure factor) is manually set to a desired value, and the exposure mode is changed to the shutter speed priority exposure mode [Av auto, Tv manual, Sv auto], in which two unchanged exposure factors (Sv and Av) are automatically calculated and set.

When the Tv dial (second operation member) is operated in the ISO sensitivity priority exposure mode [Av auto, Tv auto, Sv manual], the shutter speed (second exposure factor) is manually set to a desired value with the ISO sensitivity (first exposure factor) unchanged, and the exposure mode is changed to the ISO sensitivity/shutter speed priority exposure mode [Av auto, Tv manual, Sv manual], in which the first and second exposure factors are manually set. When the Sv dial (first operation member) is operated in the shutter speed priority exposure mode [Av auto, Tv manual, Sv auto], the ISO sensitivity (first exposure factor) is manually set to a desired value with the shutter speed (second exposure factor) unchanged, and the exposure mode is changed to the ISO sensitivity/shutter speed priority exposure mode [Av auto, Tv manual, Sv manual], in which the first and second exposure factors are manually set.

When the Sv dial (first operation member) is operated in the ISO sensitivity/shutter speed priority exposure mode [Av auto, Tv manual, Sv manual], the ISO sensitivity (first exposure factor) is newly manually set, with the ISO sensitivity/shutter speed priority exposure mode unchanged. When the Tv dial (second operation member) is then operated in the ISO sensitivity/shutter speed priority exposure mode [Av auto, Tv manual, Sv manual], the shutter speed (second exposure factor) is manually set, with the ISO sensitivity/shutter speed priority exposure mode unchanged.

The operation of the Sv dial in the programmed exposure mode [Av auto, Tv auto, Sv auto] as an initial exposure mode changes this exposure mode to the ISO sensitivity priority exposure mode [Av auto, Tv auto, Sv manual], in which the ISO sensitivity (first exposure factor) is manually set, and two unchanged exposure factors (Av and Tv) are automatically calculated and set. When the Tv dial (second operation member) is then operated in the ISO sensitivity priority exposure mode, the shutter speed (second exposure factor) is newly set manually with the ISO sensitivity (first exposure factor) unchanged, thereby entering the ISO sensitivity/shutter speed priority exposure mode [Av auto, Tv manual, Sv manual]. Thereafter, the Sv dial (first operation member) is operated in the ISO sensitivity/shutter speed priority exposure mode, to newly set the ISO sensitivity (first exposure factor) manually, while keeping the ISO sensitivity/shutter speed priority exposure mode.

Likewise, the operation of the Tv dial in the programmed exposure mode [Av auto, Tv auto, Sv auto] as an initial exposure mode changes this exposure mode to the shutter speed priority exposure mode [Av auto, Tv manual, Sv auto], in which the shutter speed (second exposure factor) is manually set, and two unchanged exposure factors (Sv and Av) are automatically calculated and set. When the Sv dial (first operation member) is then operated in the shutter speed priority exposure mode, the ISO sensitivity (first exposure factor) is newly set manually with the shutter speed (second exposure factor) unchanged, thereby entering the ISO sensitivity/shutter speed priority exposure mode [Av auto, Tv manual, Sv manual]. Thereafter, the Tv dial (second operation member) is operated in the ISO sensitivity/shutter speed priority exposure mode, to newly set the shutter speed (second exposure factor) manually, while keeping the ISO sensitivity/shutter speed priority exposure mode.

With the front electronic dial 116 (first operation member) provided with a function of changing the ISO sensitivity (first exposure factor), and the rear electronic dial 117 (second operation member) provided with a function of changing the shutter speed (second exposure factor) as described above, the exposure-mode-changing pattern is shown in FIG. 4(*a*). A display example of exposure factors on the external liquid crystal panel 114 and the viewfinder liquid crystal panel 121 is shown in FIG. 4(*b*).

In FIG. 4(*a*), the exposure modes are expressed by circled symbols, and dial operations are expressed by solid arrows. As shown in FIG. 4(*a*), the P exposure mode (circled P) is changed to the Sv priority exposure mode (circled Sv) through a solid arrow with "Sv," by the operation of the Sv dial, and the Sv priority exposure mode (circled Sv) is changed to the Sv/Tv priority exposure mode (circled Sv/Tv) through a solid arrow with "Tv," by the operation of the Tv dial. The P exposure mode (circled P) is changed to the Tv priority exposure mode (circled Tv) through a solid arrow with "Tv," by the operation the Tv dial, and the Tv priority exposure mode (circled Tv) is changed to the Sv/Tv priority exposure mode (circled Sv/Tv) through a solid arrow with "Sv," by the operation of the Sv dial. When the Sv dial is operated in the Sv priority exposure mode (circled Sv), the Sv priority exposure mode is unchanged as shown by a round solid arrow with "Sv," when the Tv dial is operated in the Tv priority exposure mode (circled Tv), the Tv priority exposure mode is unchanged as shown by a round solid arrow with "Tv," and when the Sv or Tv dial is operated in the Sv/Tv priority exposure mode (circled Sv/Tv), the Sv/Tv priority exposure mode is unchanged as shown by a round solid arrow with "Sv, Tv."

Figure 4A:
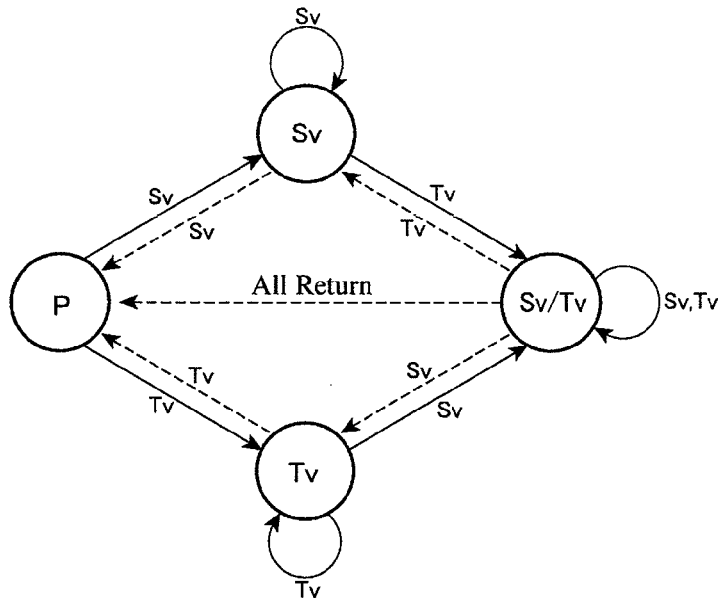
FIG. 4(a) is a schematic view showing a first exposure-mode-changing pattern in the imaging apparatus according to the first embodiment of the present invention.
Figure 4B:
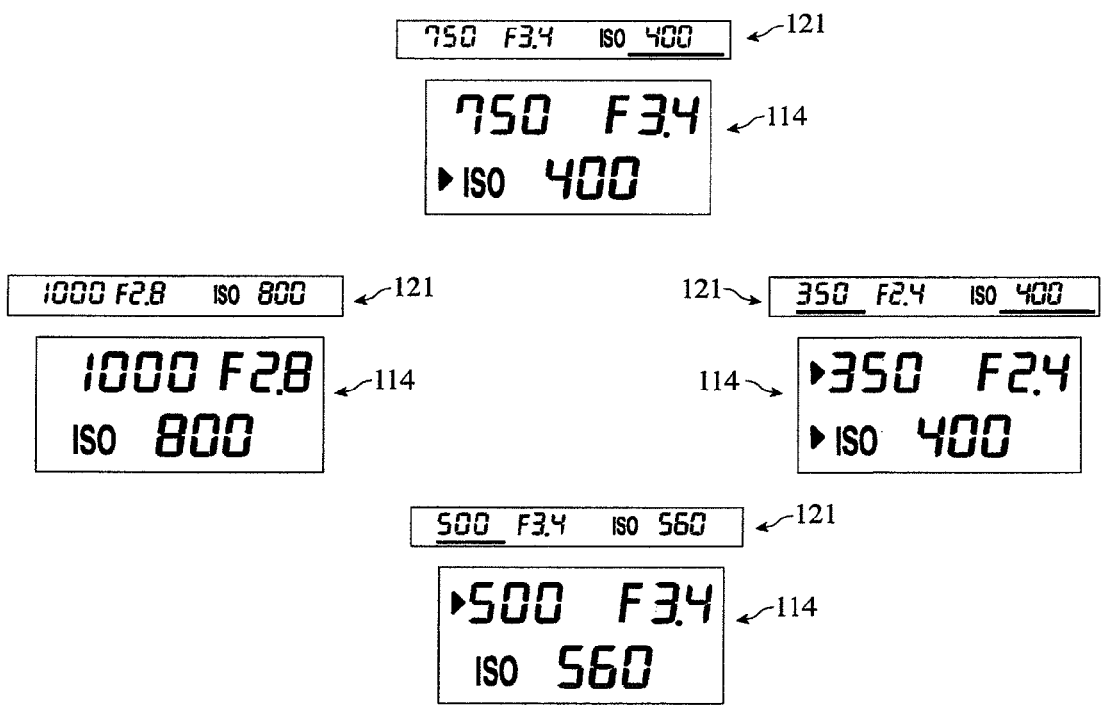
FIG. 4(b) is a schematic view showing a display example of the exposure factors in an external liquid crystal panel and a viewfinder liquid crystal panel in each exposure mode in the first exposure-mode-changing pattern shown in FIG. 4(a).

FIG. 4(b) shows a display example of exposure factors on the external liquid crystal panel 114 and the viewfinder liquid crystal panel 121 at the same positions as in FIG. 4(a). Namely, among four displays, a left display indicates the P exposure mode, an upper display indicates the Sv priority exposure mode, a lower mode indicates the Tv priority exposure mode, and a right display indicates the Sv/Tv priority exposure mode. The viewfinder liquid crystal panel 121 displays a reciprocal number (/second) of shutter speed (Tv), a symbol "F"+aperture value (Av), and a symbol "ISO"+ISO sensitivity (Sv) in this order from left, and the external liquid crystal panel 114 displays a reciprocal number (/second) of shutter speed (Tv) on the upper left side, a symbol "F"+aperture value (Av) on the upper right side, and a symbol "ISO"+ISO sensitivity (Sv) on the lower side. For example, the left display (corresponding to P exposure mode) in FIG. 4(b) indicates a shutter speed (Tv) of 1/1000 second, an aperture value (Av) of F2.8, and ISO sensitivity (Sv) of ISO 800.

Because the ISO sensitivity (Sv) is manually set in the Sv priority exposure mode (upper side), the display of the ISO sensitivity is emphasized by an underbar in the viewfinder liquid crystal panel 121, and by a right triangular arrow in the external liquid crystal panel 114. Because the shutter speed (Tv) is manually set in the Tv priority exposure mode (lower side), the display of the shutter speed is emphasized by an underbar in the viewfinder liquid crystal panel 121, and by a right triangular arrow in the external liquid crystal panel 114. Likewise, because the ISO sensitivity (Sv) and the shutter speed (Tv) are manually set in the Sv/Tv priority exposure mode (right side), the displays of the ISO sensitivity and the shutter speed are emphasized by underbars in the viewfinder liquid crystal panel 121, and by right triangular arrows in the external liquid crystal panel 114. Because all exposure factors are calculated and set in the P exposure mode (left side), any exposure factors are not emphasized.

(ii) Second Exposure-Mode-Changing Pattern

The operation of the imaging apparatus 100 will be explained below, in a second pattern in which among three exposure factors of the ISO sensitivity (Sv), the aperture value (Av) and the shutter speed (Tv), the ISO sensitivity (first exposure factor) is changed by a front electronic dial 116 (first operation member), and the aperture value (second exposure factor) is changed by a rear electronic dial 117 (second operation member). These two dials 116 and 117 are simply called "Sv dial" and "Av dial," respectively.

The operation of the Sv dial in the programmed exposure mode [Av auto, Tv auto, Sv auto] (first-to-third-exposure-factors-calculating-and-setting exposure mode) as an initial exposure mode changes this exposure mode to the ISO sensitivity priority exposure mode [Av auto, Tv auto, Sv manual], in which the ISO sensitivity (first exposure factor) is manually set, and two unchanged exposure factors (Av and Tv) are automatically calculated and set. The operation of the Av dial in the programmed exposure mode changes this exposure mode to the aperture value priority exposure mode [Av manual, Tv auto, Sv auto], in which the aperture value (second exposure factor) is manually set, and two unchanged exposure factors (Sv and Tv) are automatically calculated and set.

When the Av dial (second operation member) is operated in the ISO sensitivity priority exposure mode [Av auto, Tv auto, Sv manual], the aperture value (second exposure factor) is manually set to a desired value with the ISO sensitivity (first exposure factor) unchanged, thereby entering the ISO sensitivity/aperture value priority first/second-exposure-factors-manually-setting exposure mode [Av manual, Tv auto, Sv manual]. When the Sv dial (first operation member) is operated in the aperture value priority exposure mode [Av manual, Tv auto, Sv auto], the ISO sensitivity (first exposure factor) is manually set to a desired value with the aperture value (second exposure factor) unchanged, thereby entering the ISO sensitivity/aperture value priority exposure mode [Av manual, Tv auto, Sv manual] (first/second-exposure-factors-manually-setting exposure mode).

When the Sv dial (first operation member) is operated in the ISO sensitivity/aperture value priority exposure mode [Av manual, Tv auto, Sv manual], the ISO sensitivity (first exposure factor) is newly manually set, while keeping the ISO sensitivity/aperture value priority exposure mode. When the Av dial (second operation member) is then operated in the ISO sensitivity/aperture value priority exposure mode, the aperture value (second exposure factor) is manually set to a new value while keeping the ISO sensitivity/aperture value priority exposure mode.

The operation of the Sv dial in the programmed exposure mode [Av auto, Tv auto, Sv auto] as an initial exposure mode changes this exposure mode to the ISO sensitivity priority exposure mode [Av auto, Tv auto, Sv manual], in which the ISO sensitivity (first exposure factor) is manually set, and two unchanged exposure factors (Av and Tv) are automatically calculated and set. The Av dial (second operation member) is then operated in the ISO sensitivity priority exposure mode, to newly set the aperture value (second exposure factor) manually without changing the ISO sensitivity (first exposure factor), thereby entering the ISO sensitivity/aperture value priority exposure mode [Av manual, Tv auto, Sv manual]. When the Sv dial (first operation member) is then operated in the ISO sensitivity/aperture value priority exposure mode [Av manual, Tv auto, Sv manual], the ISO sensitivity (first exposure factor) is newly set manually, while keeping the ISO sensitivity/aperture value priority exposure mode.

Likewise, when the Av dial is operated in the programmed exposure mode [Av auto, Tv auto, Sv auto] as an initial exposure mode, the programmed exposure mode is changed to the aperture value priority exposure mode [Av manual, Tv auto, Sv auto], in which the aperture value (second exposure factor) is manually set, and two unchanged exposure factors (Sv and Tv) are automatically calculated and set. When the Sv dial (first operation member) is then operated in the aperture value priority exposure mode, the ISO sensitivity (first exposure factor) is manually set, with the aperture value (second exposure factor) unchanged, thereby entering the ISO sensitivity/aperture value priority exposure mode [Av manual, Tv auto, Sv manual]. When the Av dial (second operation member) is then operated in the ISO sensitivity/ aperture value priority exposure mode [Av manual, Tv auto, Sv manual], the aperture value (second exposure factor) is newly manually set, while keeping the ISO sensitivity/aperture value priority exposure mode.

Figure 5A:
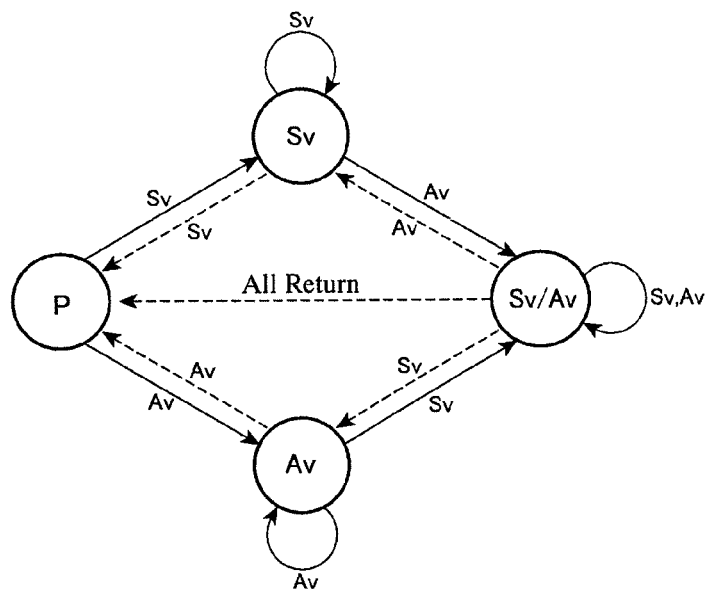
FIG. 5(a) is a schematic view showing a second exposure-mode-changing pattern in the imaging apparatus according to the first embodiment of the present invention.
Figure 5B:
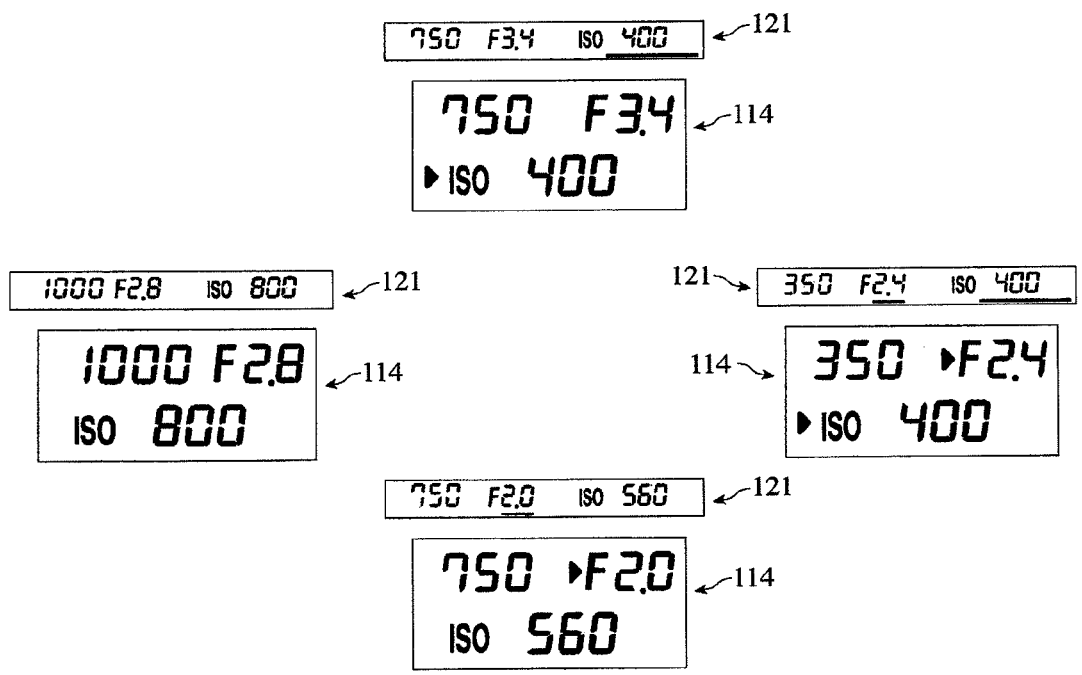
FIG. 5(b) is a schematic view showing a display example of exposure factors in an external liquid crystal panel and a viewfinder liquid crystal panel, which corresponds to each exposure mode in the second exposure-mode-changing pattern shown in FIG. 5(a).

FIG. 5(a) shows an exposure-mode-changing pattern, in which the ISO sensitivity (first exposure factor) is changed by the front electronic dial 116 (first operation member), and the aperture value (second exposure factor) is changed by the rear electronic dial 117 (second operation member), and FIG. 5(b) shows a display example of exposure factors on the external liquid crystal panel 114 and the viewfinder liquid crystal panel 121. FIG. 5(b) shows the displays of exposure factors at positions corresponding to those shown in FIG. 5(a). Namely, among four displays, a left display indicates the P exposure mode, an upper display indicates the Sv priority exposure mode, a lower mode indicates the Av priority exposure mode, and a right display indicates the Sv/Av priority exposure mode.

As shown in FIG. 5(a), when the Sv dial is operated in the P exposure mode (circled P), the P exposure mode is changed to the Sv priority exposure mode (circled Sv). When the Av dial is operated in the Sv priority exposure mode, the Sv priority exposure mode is changed to the Sv/Av priority exposure mode (circled Sv/Av). When the Av dial is operated in the P exposure mode (circled P), the P exposure mode is changed to the Av priority exposure mode (circled Av). When the Sv dial is operated in the Av priority exposure mode, the Av priority exposure mode is changed to the Sv/Av priority exposure mode (circled Sv/Av). On the other hand, when the Sv dial is operated in the Sv priority exposure mode (circled Sv), the Sv priority exposure mode is unchanged. When the Av dial is operated in the Av priority exposure mode (circled Av), the Av priority exposure mode (circled Av) is unchanged. When the Sv or Av dial is operated in the Sv/Av priority exposure mode (circled Sv/Av), the Sv/Av priority exposure mode is unchanged.

Because the ISO sensitivity (Sv) is manually set in the Sv priority exposure mode (upper side), the display of the ISO sensitivity is emphasized by an underbar on the viewfinder liquid crystal panel 121, and by a right triangular arrow on the external liquid crystal panel 114. Because the aperture value (Av) is manually set in the Av priority exposure mode (lower side), the display of the aperture value is emphasized by an underbar on the viewfinder liquid crystal panel 121, and by a right triangular arrow on the external liquid crystal panel 114. Likewise, because the ISO sensitivity (Sv) and the aperture value (Av) are manually set in the Sv/Av priority exposure mode (right side), the displays of the ISO sensitivity and the aperture value are emphasized by underbars on the viewfinder liquid crystal panel 121, and by right triangular arrows on the external liquid crystal panel 114. Because all exposure factors are calculated and set in the P exposure mode (left side), any exposure factors are not emphasized.

(iii) Third Exposure-Mode-Changing Pattern

The operation of the imaging apparatus 100 will be explained below, in a third pattern in which among three exposure factors of the ISO sensitivity (Sv), the aperture value (Av) and the shutter speed (Tv), the aperture value (first exposure factor) is changed by a front electronic dial 116 (first operation member), and the shutter speed (second exposure factor) is changed by a rear electronic dial 117 (second operation member). These two dials 116 and 117 are simply called "Av dial" and "Tv dial," respectively.

The operation of the Av dial in the programmed exposure mode [Av auto, Tv auto, Sv auto] (first-to-third-exposure-factors-calculating-and-setting exposure mode) as an initial exposure mode changes this exposure mode to the aperture value priority exposure mode [Av manual, Tv auto, Sv auto] (first-exposure-factor-manually-setting exposure mode), in which the aperture value (first exposure factor) is manually set, and two unchanged exposure factors (Sv and Tv) are automatically calculated and set. Also, the operation of the Tv dial in the programmed exposure mode as an initial exposure mode changes this exposure mode to the shutter speed priority exposure mode [Av auto, Tv manual, Sv auto] (second-exposure-factor-manually-setting exposure mode), in which the shutter speed (second exposure factor) is manually set, and two unchanged exposure factors (Sv and Av) are automatically calculated and set.

When the Tv dial (second operation member) is operated in the aperture value priority exposure mode [Av manual, Tv auto, Sv auto], the shutter speed (second exposure factor) is manually set to a desired value with the aperture value (first exposure factor) unchanged, thereby entering the shutter speed/aperture value priority exposure mode [Av manual, Tv manual, Sv auto] (first/second-exposure-factors-manually-setting exposure mode). Also, when the Av dial (first operation member) is operated in the shutter speed priority exposure mode [Av auto, Tv manual, Sv auto], the aperture value (first exposure factor) is manually set to a desired value with the shutter speed (second exposure factor) unchanged, thereby entering the shutter speed/aperture value priority exposure mode [Av manual, Tv manual, Sv auto] (first/second-exposure-factors-manually-setting exposure mode).

When the Av dial (first operation member) is operated in the shutter speed/aperture value priority exposure mode [Av manual, Tv manual, Sv auto], the aperture value (first exposure factor) is manually set to a new value while keeping the shutter speed/aperture value priority exposure mode. Also, when the Tv dial (second operation member) is operated in the shutter speed/aperture value priority exposure mode [Av manual, Tv manual, Sv auto], the shutter speed (second exposure factor) is manually set to a new value while keeping the shutter speed/aperture value priority exposure mode.

The Av dial is operated in the programmed exposure mode [Av auto, Tv auto, Sv auto] as an initial exposure mode to enter the aperture value priority exposure mode [Av manual, Tv auto, Sv auto], in which the aperture value (first exposure factor) is manually set, and two unchanged exposure factors (Sv and Tv) are automatically calculated and set. When the Tv dial (second operation member) is then operated in the aperture value priority exposure mode [Av manual, Tv auto, Sv auto], the shutter speed (second exposure factor) is manually set to a desired value with the aperture value (first exposure factor) unchanged, thereby entering the shutter speed/aperture value priority exposure mode [Av manual, Tv manual, Sv auto]. When the Av dial (first operation member) is then operated in the shutter speed/aperture value priority exposure mode [Av manual, Tv manual, Sv auto], the aperture value (first exposure factor) is newly manually set while keeping the shutter speed/aperture value priority exposure mode.

Likewise, the Tv dial is operated in the programmed exposure mode [Av auto, Tv auto, Sv auto] as an initial exposure mode to change this exposure mode to the shutter speed priority exposure mode [Av auto, Tv manual, Sv auto], in which the shutter speed (second exposure factor) is manually set, and two unchanged exposure factors (Sv and Av) are automatically calculated and set. When the Av dial (first operation member) is then operated in the shutter speed priority exposure mode, the aperture value (first exposure factor) is manually set to a desired value with the shutter speed (second exposure factor) unchanged, thereby entering the shutter speed/aperture value priority exposure mode [Av manual, Tv manual, Sv auto]. When the Tv dial (second operation member) is further operated in the shutter speed/aperture value priority exposure mode [Av manual, Tv manual, Sv auto], the shutter speed (second exposure factor) is newly manually set while keeping the shutter speed/aperture value priority exposure mode.

Figure 6A:
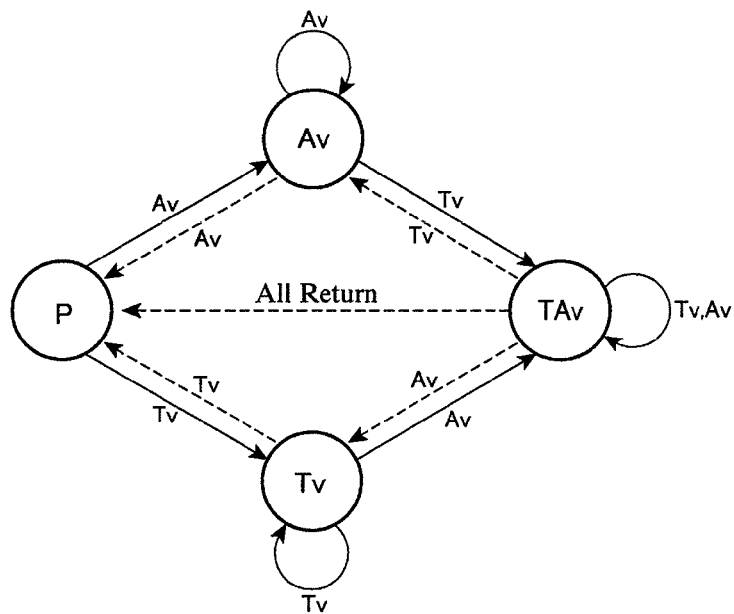
FIG. 6(a) is a schematic view showing a third exposure-mode-changing pattern in the imaging apparatus according to the first embodiment of the present invention.
Figure 6B:
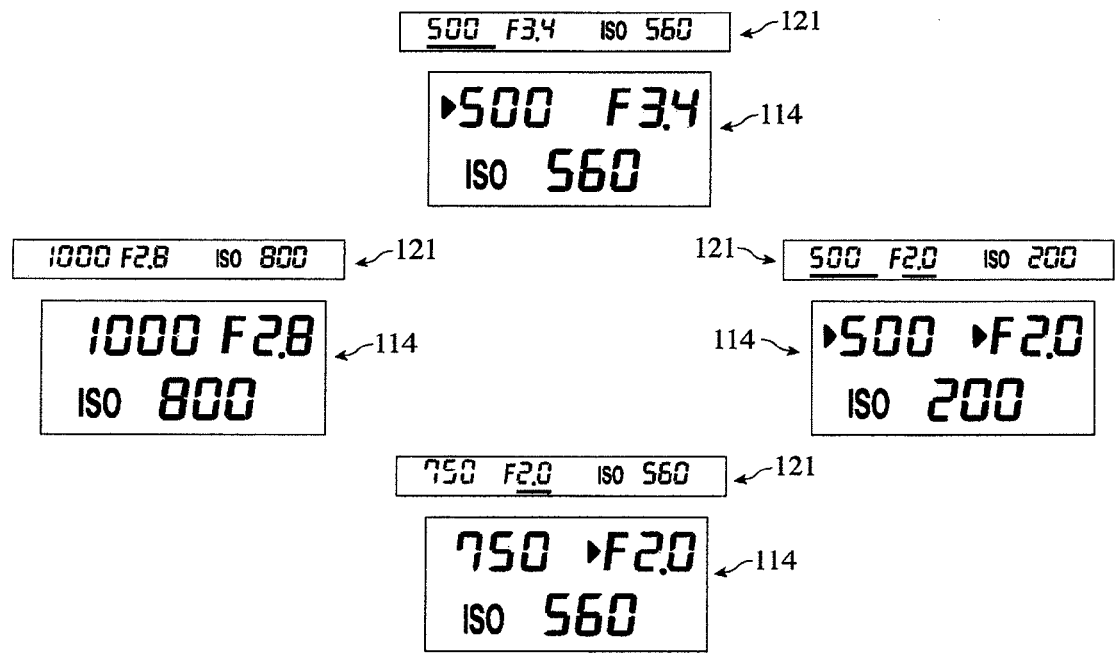
FIG. 6(b) is a schematic view showing a display example of exposure factors in an external liquid crystal panel and a viewfinder liquid crystal panel, in each exposure mode corresponding to that in the third exposure-mode-changing pattern shown in FIG. 6(a).

FIG. 6(a) shows the above exposure-mode-changing pattern, in which the aperture value/shutter speed (first exposure factor) is changed by the front electronic dial 116 (first operation member), and the shutter speed (second exposure factor) is changed by the rear electronic dial 117 (second operation member). FIG. 6(b) shows a display example of exposure factors in the above exposure-mode-changing pattern, on the external liquid crystal panel 114 and the viewfinder liquid crystal panel 121.

As shown in FIG. 6(a), when the Av dial is operated in the P exposure mode (circled P), the P exposure mode is changed to the Av priority exposure mode (circled Av). When the Tv dial is operated in the Av priority exposure mode, the Av priority exposure mode is changed to the TAv priority exposure mode (circled TAv). When the Tv dial is operated in the P exposure mode (left), the P exposure mode is changed to the Tv priority exposure mode (circled Tv). When the Av dial is operated in the Tv priority exposure mode, the Tv priority exposure mode is changed to the TAv priority exposure mode (circled TAv). On the other hand, when the Av dial is operated in the Av priority exposure mode (circled Av), the Av priority exposure mode is unchanged. When the Tv dial is operated in the Tv priority exposure mode (circled Tv), the Tv priority exposure mode is unchanged. When the Av or Tv dial is operated in the TAv priority exposure mode (circled TAv), the TAv priority exposure mode is unchanged.

FIG. 6(b) shows a display example of exposure factors in the above exposure-mode-changing pattern, on the external liquid crystal panel 114 and the viewfinder liquid crystal panel 121. In FIG. 6(b), the displays of four exposure modes are arranged at the same positions as in FIG. 6(a). Namely, among four displays, a left display indicates the P exposure mode, an upper display indicates the Av priority exposure mode, a lower display indicates the Tv priority exposure mode, and a right display indicates the TAv priority exposure mode.

Because the aperture value (Av) is manually set in the Av priority exposure mode (upper side), the display of the aperture value is emphasized by an underbar on the viewfinder liquid crystal panel 121, and by a right triangular arrow on the external liquid crystal panel 114. Because the shutter speed (Tv) is manually set in the Tv priority exposure mode (lower side), the display of the shutter speed is emphasized by an underbar on the viewfinder liquid crystal panel 121, and by a right triangular arrow on the external liquid crystal panel 114. Likewise, because the shutter speed (Tv) and aperture value (Av) are manually set in the TAv priority exposure mode (right side), the displays of the shutter speed and the aperture value are emphasized by underbars on the viewfinder liquid crystal panel 121, and by right triangular arrows on the external liquid crystal panel 114. Because all exposure factors are calculated and set in the P exposure mode (left side), any exposure factors are not emphasized.

(iv) Returning Means

In any of the first to third exposure-mode-changing patterns, the imaging apparatus of the present invention preferably comprises a one-operation-returning means for returning the first/second-exposure-factors-manually-setting exposure mode to the first-exposure-factor-manually-setting exposure mode or the second-exposure-factor-manually-setting exposure mode, by one operation for changing any one of the first and second exposure factors to the calculated and set one. The imaging apparatus may further comprise a one-operation-all-returning means for returning any exposure mode to the programmed exposure mode (first-to-third-exposure-factors-calculating-and-setting exposure mode) as an initial exposure mode by one operation. In this case, each of the first and second operation members is preferably provided with each means for returning the first and second exposure factors to the calculated and set ones.

In the first changing pattern, the imaging apparatus of the present invention preferably comprises (a) a one-operation-returning means for returning the ISO sensitivity/shutter speed priority exposure mode [Av auto, Tv manual, Sv manual] to the shutter speed priority exposure mode [Av auto, Tv manual, Sv auto] (returning only the ISO sensitivity (Sv) to the calculated and set one), and (b) a one-operation-returning means for returning the ISO sensitivity/shutter speed priority exposure mode to the ISO sensitivity priority exposure mode [Av auto, Tv auto, Sv manual] (returning only the shutter speed (Tv) to the calculated and set one). Such one-operation-returning means is preferably assigned to, for example, a reset button 118 shown in FIG. 2(b), which returns an immediately previous operation to the calculated and set one by click, thereby returning to the shutter speed priority exposure mode or the ISO sensitivity priority exposure mode. Further, the Sv dial (first operation member) is preferably provided with a means (for example, click of the Sv dial) for returning only the ISO sensitivity (Sv) to the calculated and set one, and the Tv dial (second operation member) is preferably provided with a means (for example, click of the Tv dial) for returning only the shutter speed (Tv) to the calculated and set one.

The imaging apparatus of the present invention may further comprise a one-operation-all-returning means for returning the ISO sensitivity/shutter speed priority exposure mode [Av auto, Tv manual, Sv manual] to the programmed exposure mode [Av auto, Tv auto, Sv auto] (returning both of the ISO sensitivity (Sv) and the shutter speed (Tv) to the calculated and set ones). Thus, the one-operation-all-returning means for returning to the programmed exposure mode may be, for example, the long press, double click, etc. of the Sv or Tv dial, or the click, double click, long press, etc. of the reset button 118 shown in FIG. 2(b). Also, the imaging apparatus of the present invention may further comprise an all-returning button (home button) for returning any exposure mode to the programmed exposure mode as an initial exposure mode by one operation.

Likewise, in the second changing pattern, the imaging apparatus of the present invention preferably comprises (a) a one-operation-returning means for returning the ISO sensitivity/aperture value priority exposure mode [Av manual, Tv auto, Sv manual] to the aperture value priority exposure mode [Av manual, Tv auto, Sv auto] (returning only the ISO sensitivity (Sv) to the calculated and set one), and (b) a one-operation-returning means for returning the ISO sensitivity/aperture value priority exposure mode [Av manual, Tv auto, Sv manual] to the ISO sensitivity priority exposure mode [Av auto, Tv auto, Sv manual] (returning only the aperture value (Av) to the calculated and set one). Such one-operation-returning means may be owned by, for example, the reset button 118, whose clicking can return an immediately previous operation to the calculated and set one, thereby returning to the aperture value priority exposure mode or the ISO sensitivity priority exposure mode. Further, the Sv dial (first operation member) is preferably provided with a means (for example, click of the Sv dial) for returning only the ISO sensitivity (Sv) to calculated and set one, and the Sv dial (second operation member) is preferably provided with a means (for example, click of the Sv dial) for returning only the ISO sensitivity (Sv) to the calculated and set one.

The imaging apparatus of the present invention may further comprises a one-operation-all-returning means for returning the ISO sensitivity/aperture value priority exposure mode [Av manual, Tv auto, Sv manual] to the programmed exposure mode [Av auto, Tv auto, Sv auto] (returning both of the ISO sensitivity (Sv) and the aperture value (Av) to the calculated and set ones). The one-operation-all-returning means for returning to the programmed exposure mode may be, for example, the long press, double click, etc. of the Sv or Av dial, or the click, double click, long press, etc. of the reset button 118 shown in FIG. 2(b). Also, the imaging apparatus of the present invention may further comprise an all-returning button (home button) for returning any exposure mode to the programmed exposure mode as an initial exposure mode by one operation.

Likewise, in the third changing pattern, the imaging apparatus of the present invention preferably further comprises (a) a one-operation-returning means for returning the shutter speed/aperture value priority exposure mode [Av manual, Tv manual, Sv auto] to the shutter speed priority exposure mode [Av auto, Tv manual, Sv auto] (returning only the aperture value (Av) to the calculated and set one), and (b) a one-operation-returning means for returning the shutter speed/aperture value priority exposure mode to the aperture value priority exposure mode [Av manual, Tv auto, Sv auto] (returning only the shutter speed (Tv) to the calculated and set one). Such one-operation-returning means may be owned by, for example, the reset button 118, whose clicking can return an immediately previous operation to the calculated and set one, thereby returning to the shutter speed priority exposure mode or the aperture value priority exposure mode. Further, the Av dial (first operation member) is preferably provided with a means (for example, click of the Av dial) for returning only the aperture value (Av) to the calculated and set one, and the Tv dial (second operation member) is preferably provided with a means (for example, click of the Tv dial) for returning only the shutter speed (Tv) to the calculated and set one.

The imaging apparatus of the present invention may further comprise a one-operation-all-returning means for returning the shutter speed/aperture value priority exposure mode [Av manual, Tv manual, Sv auto] to the programmed exposure mode [Av auto, Tv auto, Sv auto] (returning both of the aperture value (Av) and the shutter speed (Tv) to the calculated and set ones). The one-operation-all-returning means for returning to the programmed exposure mode may be, for example, the long press, double click, etc. of the Tv or Av dial, or the click, double click, long press, etc. of the reset button 118 shown in FIG. 2(b). Also, the imaging apparatus of the present invention may further comprise an all-returning button (home button) for returning any exposure mode to the programmed exposure mode as an initial exposure mode by one operation.

In any of the first to third exposure-mode-changing patterns, the imaging apparatus may comprise a one-operation-returning means for returning the first-exposure-factor-manually-setting exposure mode to the programmed exposure mode (returning the first exposure factor to the calculated and set one).

Namely, the imaging apparatus of the present invention may further comprise a one-operation-returning means for returning the ISO sensitivity priority exposure mode [Av auto, Tv auto, Sv manual], the shutter speed priority exposure mode [Av auto, Tv manual, Sv auto], or the aperture value priority exposure mode [Av manual, Tv auto, Sv auto] to the programmed exposure mode [Av auto, Tv auto, Sv auto]. The operation member for returning the ISO sensitivity priority exposure mode, the shutter speed priority exposure mode and the aperture value priority exposure mode to the programmed exposure mode may be attached to the Sv dial, the Tv dial and the Av dial, or to the reset button 118 shown in FIG. 2(b).

FIGS. 4(a), 5(a) and 6(a) show the exposure-mode-changing patterns by a one-operation-returning means and a one-operation-all-returning means. In these figures, broken-line arrows indicate the exposure-mode-changing directions of these returning means.

[2] Second Embodiment

The imaging apparatus according to the second embodiment of the present invention further comprises, in addition to the constituents of the first embodiment, a third operation member for setting a third exposure factor; whose operation in an first/second-exposure-factors-manually-setting exposure mode changes this exposure mode to a first-to-third-exposure-factors-manually-setting exposure mode, which can manually set the first to third exposure factors; and a display for indicating the comparison of the amount of exposure calculated from the set first to third exposure factors, and the amount of exposure calculated depending on the brightness value obtained by the photometry device, in the first-to-third-exposure-factors-manually-setting exposure mode.

Figure 7A:
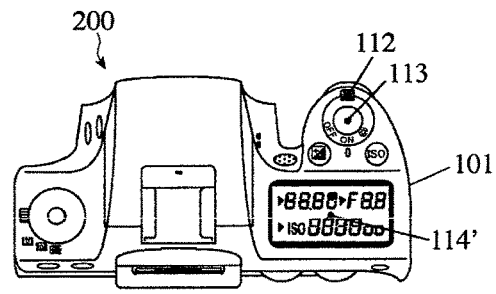
FIG. 7(a) is a plan view showing the appearance of the imaging apparatus according to the second embodiment of the present invention.
Figure 7B:
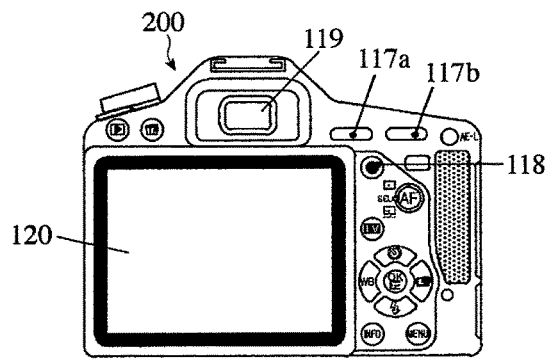
FIG. 7(b) is a rear view showing the appearance of the imaging apparatus according to the second embodiment of the present invention.
Figure 7C:
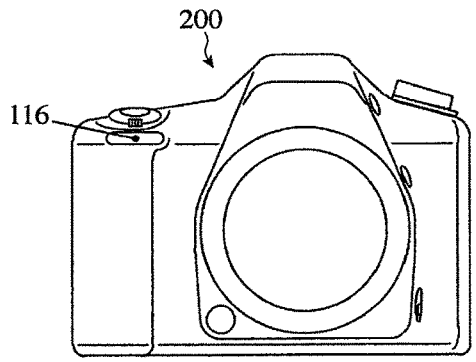
FIG. 7(c) is a front view showing the appearance of the imaging apparatus according to the second embodiment of the present invention.

FIGS. 7(a), 7(b) and 7(c) show the appearance of the imaging apparatus 200 in the second embodiment. Because the internal structure of the imaging apparatus 200 in the second embodiment is the same as in the first embodiment shown in FIG. 1, its explanation will be omitted.

(1) Structure

Figure 8A:
FIG. 8(a) is a schematic view showing another example of viewfinder liquid crystal panels in the imaging apparatus of the present invention.
Figure 8B:
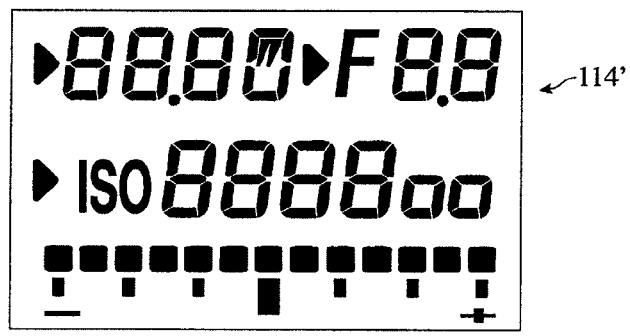
FIG. 8(b) is a schematic view showing another example of external liquid crystal panels in the imaging apparatus of the present invention.

As shown in FIG. 7(a), the imaging apparatus 200 comprises a power supply switch 112, a release switch 113, and external liquid crystal panel 114' on the right side of an upper surface of the body 101. Though the imaging apparatus 200 shown in FIGS. 7(a), 7(b) and 7(c) does not have an exposure mode dial, it may have an exposure mode dial 115 on the right side of an upper surface of the body 101 as in the first embodiment [FIG. 2(a)]. The body 101 is provided with a front electronic dial 116 on the front surface, and a first rear electronic dial 117a, a second rear electronic dial 117b, a reset button 118, a viewfinder 119, and a rear liquid crystal panel 120 on the rear surface. As shown in FIG. 8(a), the viewfinder 119 contains a viewfinder liquid crystal panel 121'. Various pieces of information such as exposure conditions are displayed in the external liquid crystal panel 114' [see FIG. 8(b)], the rear liquid crystal panel 120 and the viewfinder liquid crystal panel 121'.

The imaging apparatus 200 in the second embodiment comprises three exposure factors of a shutter speed (Tv), an aperture value (Av), and an ISO sensitivity value (Sv) for determining the exposure condition of the imaging device, as in the first embodiment. The exposure condition is determined by a combination of these exposure factors. Each exposure factor can be manually set by a user according to the exposure mode, or partially set by a user, with the remainder automatically set to proper exposure calculated by a camera depending on the brightness value, or completely automatically set by a camera. The brightness value is calculated from the object image formed by the optical system and observed by an AE sensor in the photometry device 110. The brightness value is calculated from the object image formed by the optical system and observed by an AE sensor in the photometry device 110.

(2) Exposure Mode

Because the exposure mode in the second embodiment is the same as in the first embodiment, its explanation will be omitted. Though the imaging apparatus 200 in the second embodiment does not have an exposure mode dial, the exposure mode can be changed by operating, for example, an exposure mode menu.

(3) Exposure Factor Operation Member

While the imaging apparatus 100 in the first embodiment comprises two operated operation members for setting exposure factors, the front electronic dial 116 [see FIG. 2(c)] and the rear electronic dial 117 [see FIG. 2(b)], the imaging apparatus 200 in the second embodiment is characterized by comprising three operation members, the front electronic dial 116 [see FIG. 7(c)], the first rear electronic dial 117a, and the second rear electronic dial 117b [see FIG. 7(b)]. Namely, the imaging apparatus 200 comprises a first operation member operated to set the first exposure factor, a second operation member operated to set the second exposure factor, and a third operation member operated to set the third exposure factor. The functions of the first to third operation members can be performed by, for example, the front electronic dial 116, the first rear electronic dial 117a, and the second rear electronic dial 117b, respectively.

(4) Operation (i) Exposure-Mode-Changing Pattern

The operation of the imaging apparatus 200 of the present invention will be explained below, in a case where three exposure factors of ISO sensitivity (Sv), aperture value (Av) and shutter speed (Tv) are changed by a front electronic dial (first operation member) 116, a first rear electronic dial (second operation member) 117a, and a second rear electronic dial (third operation member) 117b. These three dials are simply called "Sv dial," "Av dial," and "Tv dial," respectively.

When two exposure factors are changed among three exposure factors of the ISO sensitivity (Sv), the aperture value (Av) and the shutter speed (Tv), any one of the first to third patterns in the first embodiment is applicable. Namely, the front electronic dial 116 (first operation member) is provided with a function of changing the ISO sensitivity (first exposure factor), and the first rear electronic dial 117a (second operation member) is provided with a function of changing the aperture value (second exposure factor), as in the second exposure-mode-changing pattern in the first embodiment. Accordingly, the explanation of a case where only the front electronic dial 116 (first operation member) and the first rear electronic dial 117a (second operation member) are operated, with the second rear electronic dial 117b (third operation member) unchanged, will be omitted.

When the Sv dial (first operation member) and the Av dial (second operation member) are operated in the programmed exposure mode [Av auto, Tv auto, Sv auto] (first-to-third-exposure-factors-calculating-and-setting exposure mode) as an initial exposure mode, the programmed exposure mode is changed to the ISO sensitivity/aperture value priority exposure mode [Av manual, Tv auto, Sv manual] (first/second-exposure-factors-manually-setting exposure mode). When the Tv dial (third operation member) is then operated in the ISO sensitivity/aperture value priority exposure mode, the shutter speed (third exposure factor) is newly manually set, with the ISO sensitivity (first exposure factor) and the aperture value (second exposure factor) unchanged, thereby entering the manual exposure mode [Av manual, Tv manual, Sv manual] (first-to-third-exposure-factors-manually-setting exposure mode). The same is true in a case where the ISO sensitivity/aperture value priority exposure mode is an initial state.

Though three exposure factors of ISO sensitivity (Sv), aperture value (Av) and shutter speed (Tv) are changed by the first operation member, the second operation member and the third operation member, respectively, in the above example, the ISO sensitivity (Sv) and the shutter speed (Tv) may be changed by the first operation member and the second operation member, respectively, or the aperture value (Av) and the shutter speed (Tv) may be changed by the first operation member and the second operation member, respectively.

In a case where the first to third operation members have functions of changing the ISO sensitivity (Sv), the shutter speed (Tv) and the aperture value (Av), respectively, the operation of the Av dial (third operation member) in the ISO sensitivity/shutter speed priority exposure mode [Av auto, Tv manual, Sv manual] (corresponding to the first exposure-mode-changing pattern in the first embodiment) newly sets the aperture value (third exposure factor) manually, with the ISO sensitivity (first exposure factor) and the shutter speed (second exposure factor) unchanged, thereby entering the manual exposure mode [Av manual, Tv manual, Sv manual]. The same is true in a case where the ISO sensitivity/shutter speed priority exposure mode is an initial state.

Also, in a case where the first to third operation members have functions of changing the aperture value (Av), the shutter speed (Tv) and the ISO sensitivity (Sv), respectively, the operation of the Sv dial (third operation member) in the shutter speed/aperture value priority exposure mode [Av manual, Tv manual, Sv auto] (corresponding to the third exposure-mode-changing pattern in the first embodiment) newly sets the ISO sensitivity (third exposure factor) manually, with the aperture value (first exposure factor) and the shutter speed (second exposure factor) unchanged, thereby entering the manual exposure mode [Av manual, Tv manual, Sv manual]. The same is true in a case where the shutter speed/aperture value priority exposure mode is an initial state.

Figure 9A:
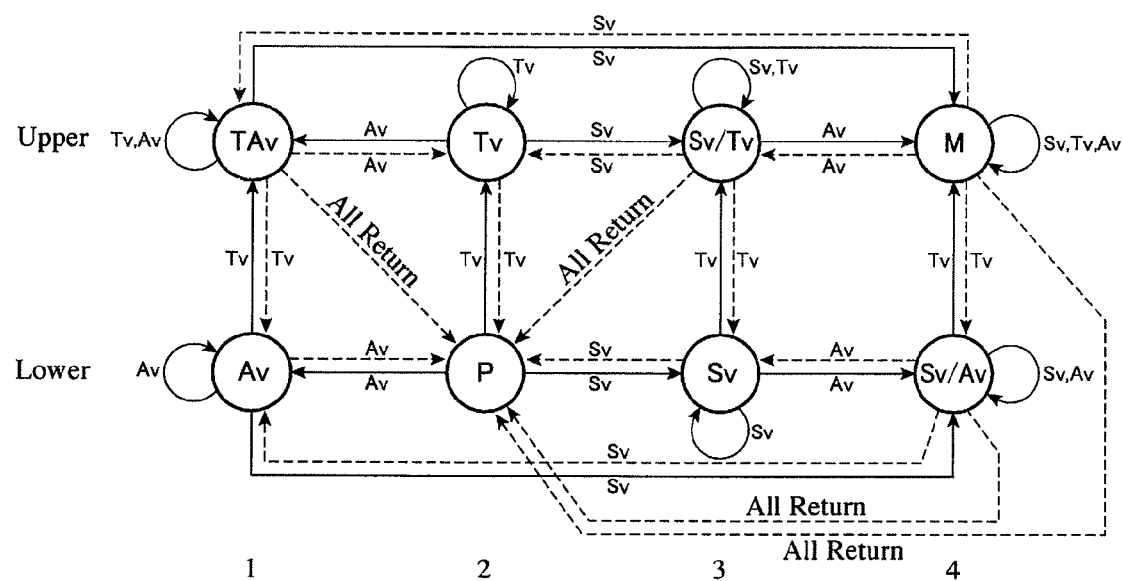
FIG. 9(a) is a schematic view showing an exposure-mode-changing pattern in the imaging apparatus according to the second embodiment of the present invention.
Figure 9B:
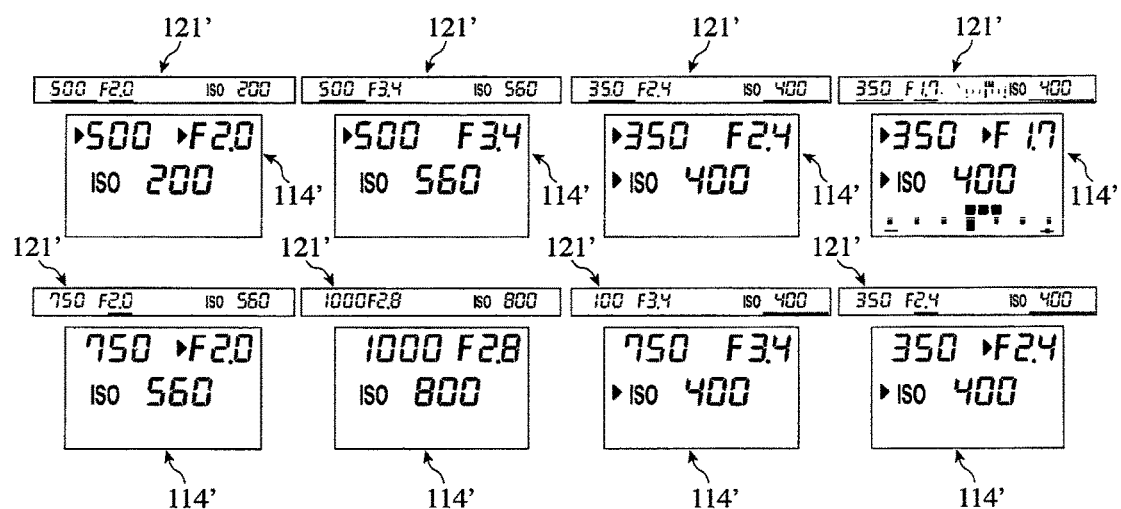
FIG. 9(b) is a schematic view showing a display example of exposure factors in an external liquid crystal panel and a viewfinder liquid crystal panel, in each exposure mode corresponding to that in the exposure-mode-changing pattern shown in FIG. 9(a).

FIG. 9(a) shows an exposure-mode-changing pattern when the Sv dial, the Av dial, and the Tv dial (first to third operation members) have functions of changing three exposure factors, the ISO sensitivity (Sv), the aperture value (Av) and the shutter speed (Tv), respectively, and FIG. 9(b) shows a display example of exposure factors on the external liquid crystal panel 114' and the viewfinder liquid crystal panel 121' in the above exposure-mode-changing pattern.

As shown in FIG. 9(a), when the Sv dial is operated in the P exposure mode (circled P), the P exposure mode is changed in a solid arrow direction (similar below) to the Sv priority exposure mode (circled Sv). When the Av dial is operated in the Sv priority exposure mode, the Sv priority exposure mode is changed to the Sv/Av priority exposure mode (circled Sv/Av). Further, when the Tv dial is operated in the Sv/Av priority exposure mode, the Sv/Av priority exposure mode is changed to the M exposure mode (circled M).

When the Sv dial is operated in the P exposure mode (circled P), the P exposure mode is changed to the Sv priority exposure mode (circled Sv). When the Tv dial is operated in the Sv priority exposure mode, the Sv priority exposure mode is changed to the Sv/Tv priority exposure mode (circled Sv/Tv). Further, when the Av dial is operated in the Sv/Tv priority exposure mode, the Sv/Tv priority exposure mode is changed to the M exposure mode (circled M).

When the Tv dial is operated in the P exposure mode (circled P), the P exposure mode is changed to the Tv priority exposure mode (circled Tv). When the Sv dial is operated in the Tv priority exposure mode, the Tv priority exposure mode is changed to the Sv/Tv priority exposure mode (circled Sv/Tv). Further, when the Av dial is operated in the Sv/Tv priority exposure mode, the Sv/Tv priority exposure mode is changed to the M exposure mode (circled M).

When the Tv dial is operated in the P exposure mode (circled P), the P exposure mode is changed to the Tv priority exposure mode (circled Tv). When the Av dial is operated in the Tv priority exposure mode, the Tv priority exposure mode is changed to the TAv priority exposure mode (circled TAv). Further, when the Sv dial is operated in the TAv priority exposure mode, the TAv priority exposure mode is changed to the M exposure mode (circled M).

When the Av dial is operated in the P exposure mode (circled P), the P exposure mode is changed to the Av priority exposure mode (circled Av). When the Sv dial is operated in the Av priority exposure mode, the Av priority exposure mode is changed to the Sv/Av priority exposure mode (circled Sv/Av). Further, when the Tv dial is operated in the Sv/Av priority exposure mode, the Sv/Av priority exposure mode is changed to the M exposure mode (circled M).

When the Av dial is operated in the P exposure mode (circled P), the P exposure mode is changed to the Av priority exposure mode (circled Av). When the Tv dial is operated in the Av priority exposure mode, the Av priority exposure mode is changed to the TAv priority exposure mode (circled TAv). Further, when the Sv dial is operated in the TAv priority exposure mode, the TAv priority exposure mode is changed to the M exposure mode (circled M).

When the Sv dial is operated in the Sv priority exposure mode (circled Sv), the Sv priority exposure mode is unchanged. When the Tv dial is operated in the Tv priority exposure mode (circled Tv), the Tv priority exposure mode is unchanged. Further, when the Av dial is operated in the Av priority exposure mode (circled Av), the Av dial is operated is unchanged.

When the Sv or Av dial is operated in the Sv/Av priority exposure mode (circled Sv/Av), the Sv/Av priority exposure mode is unchanged. When the Sv or Tv dial is operated in the Sv/Tv priority exposure mode (circled Sv/Tv), the Sv/Tv priority exposure mode is unchanged. When the Av or Tv dial is operated in the TAv priority exposure mode (circled TAv), the TAv priority exposure mode is unchanged. Further, when any one of the Sv dial, the Av dial and the Tv dial is operated in the M exposure mode (circled M), the M exposure mode is unchanged.

FIG. 9(a) shows the above exposure-mode-changing pattern, and FIG. 9(b) shows a display example of eight exposure factors on the external liquid crystal panel 114' and the viewfinder liquid crystal panel 121' at the same positions as in FIG. 9(a). Among eight displays, four upper displays indicate TAv priority exposure mode, Tv priority exposure mode, Sv/Tv priority exposure mode, and M exposure mode in this order from left, and four lower displays indicate an Av priority exposure mode, P exposure mode, Sv priority exposure mode, and Sv/Av priority exposure mode in this order from left. The viewfinder liquid crystal panel 121' displays a reciprocal number (/second) of shutter speed (Tv), a symbol "F"+aperture value (Av) and a symbol "ISO"+ISO sensitivity (Sv) in this order from left, and the external liquid crystal panel 114' displays a reciprocal number (/second) of shutter speed (Tv) on the upper left side, a symbol "F"+aperture value (Av) on the upper right side, and a symbol "ISO"+ISO sensitivity (Sv) on the lower side. In the upper left display (corresponding to Tav priority exposure mode) in FIG. 9(b), for example, the shutter speed (Tv) is ⅟500 second, the aperture value (Av) is F2.0, and the ISO sensitivity (Sv) is ISO 200.

Because the shutter speed (Tv) and the aperture value (Av) are manually set in the TAv priority exposure mode (upper left), the displays of the shutter speed and the aperture value are emphasized by underbars on the viewfinder liquid crystal panel 121', and by right triangular arrows on the external liquid crystal panel 114'.

Because the shutter speed (Tv) is manually set in the Tv priority exposure mode (second from upper left), the display of the shutter speed is emphasized by an underbar on the viewfinder liquid crystal panel 121', and by a right triangular arrow on the external liquid crystal panel 114'.

Because the ISO sensitivity (Sv) and the shutter speed (Tv) are manually set in the Sv/Tv priority exposure mode (third from upper left), the displays of the ISO sensitivity and the shutter speed are emphasized by underbars on the viewfinder liquid crystal panel 121', and by right triangular arrows on the external liquid crystal panel 114'.

Because the ISO sensitivity (Sv), the shutter speed (Tv) and the aperture value (Av) are manually set in the M exposure mode (upper right), the displays of the ISO sensitivity, the shutter speed and the aperture value are emphasized by underbars on the viewfinder liquid crystal panel 121', and by right triangular arrows on the external liquid crystal panel 114'. In the M exposure mode, the amount of exposure E1 calculated from the set first to third exposure factors (ISO sensitivity, shutter speed and aperture value), and the amount of exposure E2 calculated depending on the brightness value obtained by the photometry means are preferably compared, and displayed with respect to whether the amount of exposure E1 is proper, too much (overexposure), or too small (underexposure) to the amount of exposure E2, on a center scale in the viewfinder liquid crystal panel 121' in FIG. 8(a), and in a lower scale in the external liquid crystal panel 114' in FIG. 8(b). In the scales in the viewfinder liquid crystal panel 121' and the external liquid crystal panel 114', a center is to proper exposure, a right side (+side) is overexposure, and a left side (−side) is underexposure.

Because the aperture value (Av) is manually set in the Av priority exposure mode (lower left), the display of the aperture value is emphasized by an underbar on the viewfinder liquid crystal panel 121', and by a right triangular arrow on the external liquid crystal panel 114'.

Because all exposure factors are calculated and set in the P exposure mode (second from lower left), any exposure factors are not emphasized.

Because the ISO sensitivity (Sv) is manually set in the Sv priority exposure mode (third from lower left), the display of the ISO sensitivity is emphasized by an underbar on the viewfinder liquid crystal panel 121', and by a right triangular arrow on the external liquid crystal panel 114'.

Because the ISO sensitivity (Sv) and the aperture value (Av) are manually set in the Sv/Av priority exposure mode (lower right), the displays of the ISO sensitivity and the aperture value are emphasized by underbars on the viewfinder liquid crystal panel 121', and by right triangular arrows on the external liquid crystal panel 114'.

(ii) Returning Means

The imaging apparatus 200 preferably comprises a one-operation-returning means for returning each or all manual set exposure factors among the first to third exposure factors to the calculated and set ones by one operation. The imaging apparatus 200 may further comprise a one-operation-all-returning means for returning to the programmed exposure mode (initial state) by one operation. The means for returning the first to third exposure factors to the calculated and set ones are preferably assigned to the first to third operation members.

The imaging apparatus 200 preferably comprises a one-operation-returning means for returning the Sv priority exposure mode (circled Sv) to the P exposure mode (circled P) by changing the ISO sensitivity (Sv) to the calculated and set one, a one-operation-returning means for returning the Tv priority exposure mode (circled Tv) to the P exposure mode (circled P) by changing the shutter speed (Tv) to the calculated and set one, and a one-operation-returning means for returning the Av priority exposure mode (circled Av) to the P exposure mode (circled P) by changing the aperture value (Av) to the calculated and set one.

The imaging apparatus of the present invention preferably comprises (a) a one-operation-returning means for returning the Sv/Tv priority exposure mode (circled Sv/Tv) to the Tv priority exposure mode (circled Tv) (returning only the ISO sensitivity (Sv) to the calculated and set one), (b) a one-operation-returning means for returning the Sv/Tv priority exposure mode (circled Sv/Tv) to the Sv priority exposure mode (circled Sv) (returning only the shutter speed (Tv) to the calculated and set one), and (c) a one-operation-all-returning means for returning the Sv/Tv priority exposure mode (circled Sv/Tv) to the P exposure mode (circled P) (returning all exposure factors to the calculated and set ones).

The imaging apparatus of the present invention preferably comprises (a) a one-operation-returning means for returning the Sv/Av priority exposure mode (circled Sv/Av) to the Av priority exposure mode (circled Av) (returning only the ISO sensitivity (Sv) to the calculated and set one), (b) a one-operation-returning means for returning the Sv/Av priority exposure mode (circled Sv/Av) to the Sv priority exposure mode (circled Sv) (returning only the aperture value (Av) to the calculated and set one), and (c) a one-operation-all-returning means for returning the Sv/Av priority exposure mode (circled Sv/Av) to the P exposure mode (circled P) (returning all exposure factors to the calculated and set ones).

The imaging apparatus of the present invention preferably comprises (a) a one-operation-returning means for returning the TAv priority exposure mode (circled TAv) to the Tv priority exposure mode (circled Tv) (returning only the aperture value (Av) to the calculated and set one), (b) a one-operation-returning means for returning the TAv priority exposure mode (circled TAv) to the Av priority exposure mode (circled Av) (returning only the shutter speed (Tv) to the calculated and set one), and (c) a one-operation-all-returning means for returning the TAv priority exposure mode (circled TAv) to the P exposure mode (circled P) (returning all exposure factors to the calculated and set ones).

Also, the imaging apparatus of the present invention preferably comprises (a) a one-operation-returning means for returning the M exposure mode (circled M) to the TAv priority exposure mode (circled TAv) (returning only the ISO sensitivity (Sv) to the calculated and set one), (b) a one-operation-returning means for returning the M exposure mode (circled M) to the Sv/Av priority exposure mode (circled Sv/Av) (returning only the shutter speed (Tv) to the calculated and set one), and (c) a one-operation-returning means for returning the M exposure mode (circled M) to the Sv/Tv priority exposure mode (circled Sv/Tv) (returning only the aperture value (Av) to the calculated and set one). The imaging apparatus of the present invention preferably further comprises a one-operation-all-returning means for returning the M exposure mode (circled M) to the P exposure mode (circled P) (returning all exposure factors to the calculated and set ones).

Such returning means may be, for example, the click, double click, long press, etc. of the reset button 118 shown in FIG. 7(*b*), or the click, double click, long press, etc. of the Sv dial, the Tv dial and the Sv dial. For example, an immediately previous operation can be returned to the calculated and set one by click, and all exposure factors can be returned to the calculated and set one by long press or double click, thereby returning to the P exposure mode (initial state). An operation means for returning each exposure factor, the ISO sensitivity (Sv), the shutter speed (Tv) and the aperture value (Av), to the calculated and set one is preferably the click of the Sv dial, the Tv dial and the Av dial, respectively, and an operation means for returning all exposure factors to the calculated and set one to return to the P exposure mode is preferably the long press or double click of the reset button 118.

FIG. 9(*a*) shows the exposure-mode-changing pattern by these one-operation-returning means and one-operation-all-returning means. In FIG. 9(*a*), broken-line arrows show the exposure-mode-changing directions of these returning means.

Effects of the Invention

Because the imaging apparatus of the present invention comprises means for changing each exposure factor from a calculated and set mode to a manual mode according to the manual operation order of operation members, a user do not have to switch the exposure modes in advance. Because of simple changing operations of pluralities of exposure modes, the imaging apparatus of the present invention can change pluralities of exposure modes by simple operation, resulting in excellent operability.

What is claimed is:

1. An imaging apparatus comprising:
    an imaging device taking an image of an object formed by an optical system;
    a photometry device for metering the brightness of an object;
    first to third exposure factors for determining the exposure condition of said imaging device;
    a first controller for setting said first exposure factor;
    a second controller for setting said second exposure factor;
    a first-exposure-factor-manually-setting exposure mode for manually setting said first exposure factor, and calculating and setting said second and third exposure factors depending on the set first exposure factor and the brightness value obtained by said photometry device; and a first/second-exposure-factors-manually-setting exposure mode for manually setting said first and second exposure factors, and calculating and setting said third exposure factor depending on the set first and second exposure factors and the brightness value obtained by said photometry device;

when said second controller is operated in said first-exposure-factor-manually-setting exposure mode, said second exposure factor being manually set, and said first-exposure-factor-manually-setting exposure mode being changed to said first/second-exposure-factors-manually-setting exposure mode.

2. The imaging apparatus according to claim 1, further comprising
a first-to-third-exposure-factors-calculating-and-setting exposure mode for calculating and setting said first to third exposure factors depending on the brightness value obtained by said photometry device.

3. The imaging apparatus according to claim 1, wherein when said first controller is operated in said first-to-third-exposure-factors-calculating-and-setting exposure mode, said first exposure factor is manually set, and said first-to-third-exposure-factors-calculating-and-setting exposure mode is changed to said first-exposure-factor-manually-setting exposure mode.

4. The imaging apparatus according to claim 1, wherein when said first controller is operated in said first/second-exposure-factors-manually-setting exposure mode, said first exposure factor is manually set, with said first/second-exposure-factors-manually-setting exposure mode unchanged.

5. The imaging apparatus according to claim 1, further comprising a second-exposure-factor-manually-setting exposure mode for manually setting said second exposure factor, and calculating and setting said first and third exposure factors depending on the set second exposure factor and the brightness value obtained by said photometry device.

6. The imaging apparatus according to claim 1, further comprising a first one-operation-returner for returning said first/second-exposure-factors-manually-setting exposure mode to said second-exposure-factor-manually-setting exposure mode, by changing said first exposure factor to the calculated and set one by one operation; and/or a second one-operation-returner for returning said first/second-exposure-factors-manually-setting exposure mode to said first-exposure-factor-manually-setting exposure mode, by changing said second exposure factor to the calculated and set one by one operation.

7. The imaging apparatus according to claim 1, further comprising
a one-operation-setter that sets each manually set exposure factor among said first and second exposure factors to the calculated and set ones by one operation.

8. The imaging apparatus according to claim 1, further comprising
a third controller for setting a third exposure factor; whose operation in an first/second-exposure-factors-manually-setting exposure mode changes this exposure mode to a first-to-third-exposure-factors-manually-setting exposure mode, which can manually set the first to third exposure factors; and
a display for indicating the comparison of the amount of exposure calculated from the set first to third exposure factors, and the amount of exposure calculated depending on the brightness value obtained by the photometry device, in the first-to-third-exposure-factors-manually-setting exposure mode.

9. The imaging apparatus according to claim 8, further comprising first to third one-operation-setters that each manually set exposure factor among said first to third exposure factors to the calculated and set ones by one operation.

10. The imaging apparatus according to claim 9, wherein each of said first to third controllers are provided with each of first to third one-operation-setters for setting said first to third exposure factors to the calculated and set ones.

11. The imaging apparatus according to claim 10, wherein said first to third controllers are operated in different manners between when said first to third one-operation-setters are used, and when said first to third exposure factors are manually set.

12. The imaging apparatus according to claim 8, further comprising a one-operation-setter for setting all manually set exposure factors among said first to third exposure factors to the calculated and set ones by one operation.

* * * * *